(12) United States Patent
Kondo et al.

(10) Patent No.: US 6,430,524 B1
(45) Date of Patent: Aug. 6, 2002

(54) DATA PROCESSING METHOD AND APPARATUS

(75) Inventors: Tetsujiro Kondo; Koji Ohta, both of Tokyo; Naoki Kobayashi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/500,411

(22) Filed: Feb. 8, 2000

(30) Foreign Application Priority Data

Feb. 9, 1999 (JP) ............................................ 11-031120

(51) Int. Cl.$^7$ .............................................. G06F 17/10
(52) U.S. Cl. ...................................... 702/191; 708/300
(58) Field of Search ................................ 702/189, 190, 702/191, 193, 194, 195; 708/300

(56) References Cited

U.S. PATENT DOCUMENTS

| | | | | |
|---|---|---|---|---|
| 5,038,388 A | * | 8/1991 | Song ............................ | 382/54 |
| 5,136,529 A | * | 8/1992 | Makie et al. ................ | 364/581 |
| 5,602,761 A | * | 2/1997 | Spoerre et al. .............. | 364/554 |
| 5,694,342 A | * | 12/1997 | Stein ............................ | 364/572 |
| 5,875,216 A | * | 2/1999 | Martin ........................ | 375/347 |
| 5,909,178 A | * | 6/1999 | Balch et al. ................. | 340/572.4 |
| 6,278,961 B1 | * | 8/2001 | Kadtke et al. ............... | 702/189 |

OTHER PUBLICATIONS

Bataillou et al., Weighted Averaging with Adaptive Weight Estimation, IEEE, 1992.*
Unser et al., Weighted Averaging of a Set of Noisy Images for Maximum Signal–to–Noise Ratio, IEEE, 1990.*

* cited by examiner

*Primary Examiner*—Patrick Assouad
(74) *Attorney, Agent, or Firm*—Frommer Lawrence & Haug LLP; William S. Frommer (57) ABSTRACT

A data processing apparatus for processing input data and for outputting the processed data as output data achieves effective noise reduction. An input-reliability calculator calculates an input reliability indicating the reliability of the input data. An output-reliability calculator calculates an output reliability indicating the reliability of the output data. A correction-value calculator calculates a correction value for correcting the input reliability. A data processing unit processes the input data based on the input reliability corrected with the correction value and the output reliability, thereby obtaining the output data.

12 Claims, 5 Drawing Sheets

DATA PROCESSING METHOD AND APPARATUS

BACKGROUND OF THE INVENTION

1. Field of the Invention

The present invention generally relates to data processing methods and apparatuses and, more particularly, to a data processing method and a data processing apparatus that allow noise contained in data to be effectively eliminated.

2. Description of the Related Art

Normally, transmitted or read data, such as image data or sound data,,contains time-varying noise. Conventionally, for eliminating noise contained in data, the whole input data may be averaged (hereinafter sometimes referred to as "overall average"), or local input data may be averaged, which is referred to as "moving average".

However, the above-described conventional techniques of eliminating noise present the following problems.

The technique of calculating the overall average is effective if the degree of noise contained in the data, i.e., the signal-to-noise (S/N) ratio, is constant. However, when the S/N ratio varies, data having a poor S/N ratio adversely influences data having a good S/N ratio, thereby making it difficult to effectively remove noise.

According to the technique of calculating moving averages, the average of data which is temporally close to input data is obtained, and thus, the processing result is susceptible to variations in the S/N ratio. That is, with input data having a high S/N ratio, the processing result also has a high S/N ratio. With input data having a low S/N ratio, the processing result also has a low S/N ratio.

SUMMARY OF THE INVENTION

Accordingly, it is an object of the present invention to solve the above-described problems.

In order to achieve the above object, according to one aspect of the present invention, there is provided a data processing apparatus for processing input data and for outputting the processed data as output data. The data processing apparatus includes an input-reliability calculator for calculating an input reliability indicating the reliability of the input data. An output-reliability calculator calculates an output reliability indicating the reliability of the output data. A correction-value calculator calculates a correction value for correcting the input reliability. A data processing unit processes the input data based on the input reliability corrected with the corrected value and based on the output reliability and outputs the output data.

According to another aspect of the present invention, there is provided a data processing method for processing input data and for outputting the processed data as output data. The data processing method includes: an input-reliability calculating step of calculating an input reliability indicating the reliability of the input data; an output-reliability calculating step of calculating an output reliability indicating the reliability of the output data; a correction-value calculating step of calculating a correction value for correcting the input reliability; and a data processing step of processing the input data based on the input reliability corrected with the corrected value and based on the output reliability, and of outputting the output data.

DESCRIPTION OF THE PREFERRED EMBODIMENTS

Figure 1:
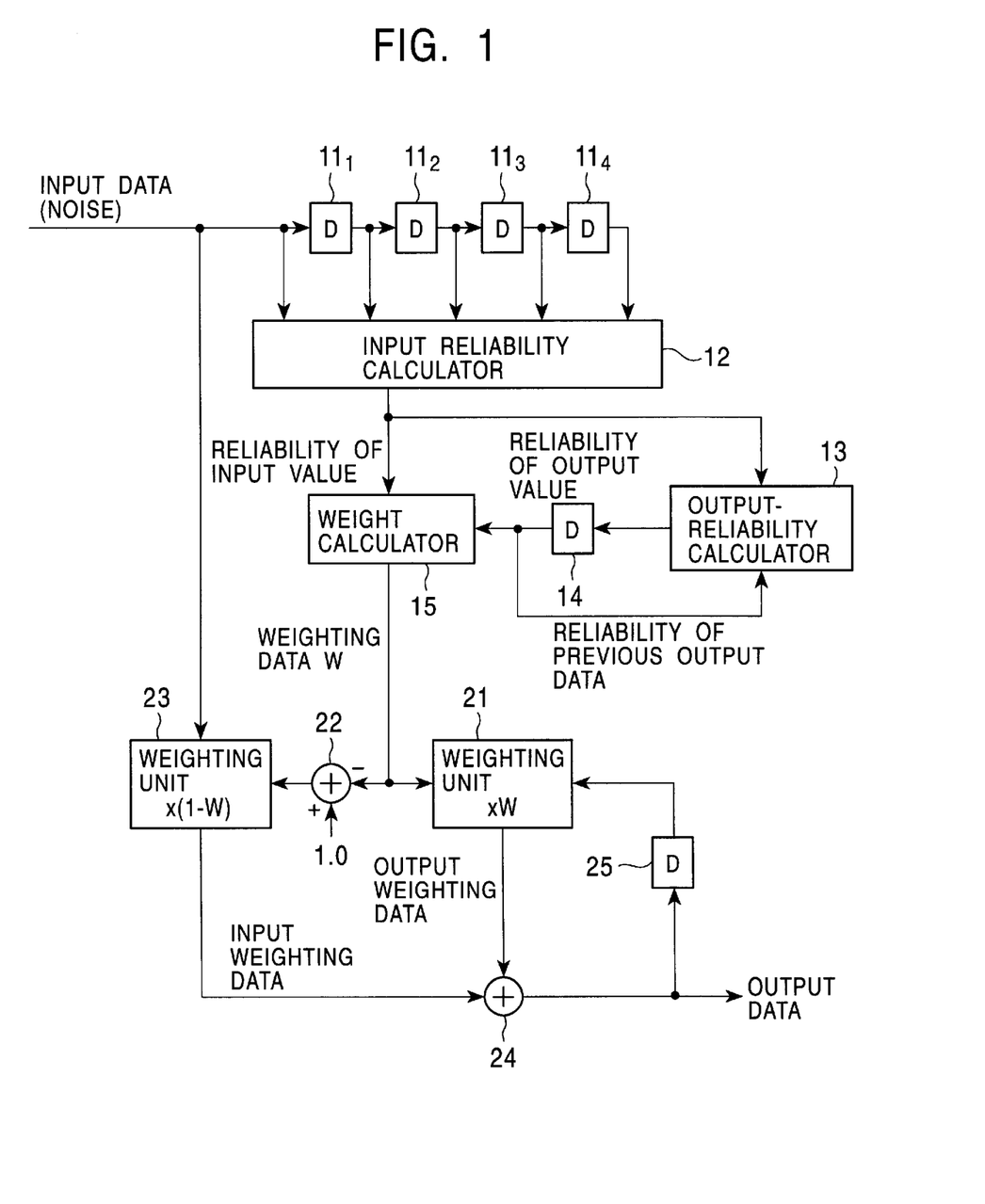
FIG. 1 is a block diagram illustrating the configuration of a noise reduction (NR) processing circuit according to an embodiment of the present invention.

FIG. 1 illustrates the configuration of a noise reduction (NR) processing circuit according to an embodiment of the present invention. In this NR processing circuit, in response to input data containing noise, self-adaptive processing is performed on the received input data, thereby obtaining output data with effectively reduced noise.

Figure 2A:
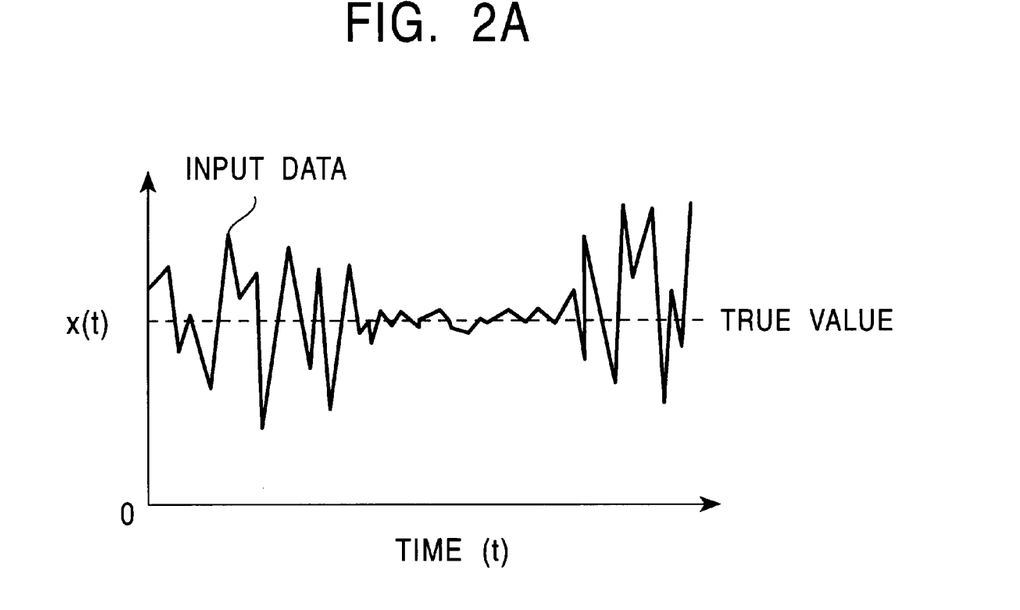
FIG. 2A illustrates the input data to be processed by the NR processing circuit shown in FIG. 1.

For example, for simple representation, it is now assumed that input data having a constant true value and time-varying noise, such as the one shown in FIG. 2A, is averaged so as to eliminate the time-varying noise. To effectively eliminate noise, a smaller weight is applied to input data with a higher level of noise (i.e., poor S/N ratio), while a larger weight is applied to input data with a lower level of noise (i.e., good S/N ratio).

Figure 2B:
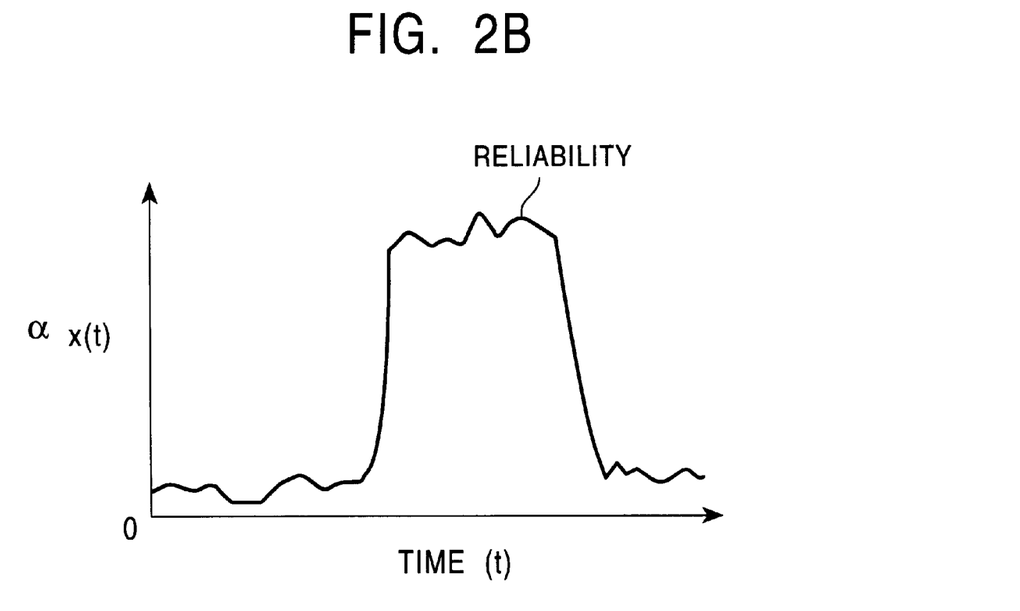
FIG. 2B illustrates the reliability of the input data shown in FIG. 2A.

In the NR processing circuit shown in FIG. 1, the following processing is performed to effectively eliminate noise. To evaluate input data, the similarity of input data to a true value, i.e., the reliability of input data relative to the true value, as shown in FIG. 2B, is first determined by real-time learning, and the input data is then weighted according to the determined reliability. Then, the average of the weighted input data is obtained.

Accordingly, in the NR processing circuit shown in FIG. 1, the weighted mean of input data by using weights (weight coefficients) according to the reliability is determined and is output as output data. When the input data, the output data, and the reliability of the input data at time t are represented by x(t), y(t), and $\alpha_{x(t)}$, the output data y(t) is expressed according to the following equation.

$$y(t) = \frac{\sum_{i=0}^{t} \alpha_{x(i)} x(i)}{\sum_{i=0}^{t} \alpha_{x(i)}} \quad (1)$$

A larger weight is applied to the input data having a higher level of reliability $\alpha_{x(t)}$.

By using equation (1), the output data y(t−1) at time t−1 with respect to the current time t is determined by the following equation.

$$y(t-1) = \frac{\sum_{i=0}^{t-1} \alpha_{x(i)} x(i)}{\sum_{i=0}^{t-1} \alpha_{x(i)}} \quad (2)$$

The same applies to the output data y(t). More specifically, to evaluate the output data y(t), the similarity of the output data to a true value, i.e., the reliability of the output data $\alpha_{y(t)}$ with respect to the true value, is used, and the reliability $\alpha_{y(t-1)}$ of the output data y(t−1) at time t−1 is defined by the following equation.

$$\alpha_{y(t-1)} = \sum_{i=0}^{t-1} \alpha_{x(i)} \quad (3)$$

The output data y(t) and the reliability $\alpha_{y(t)}$ are expressed by the following equation obtained from equations (1) through (3).

$$y(t) = \frac{\overbrace{\alpha_{y(t-1)} y(t-1)}^{\sum_{i=0}^{t-1} \alpha_{x(i)} x(i) + \alpha_{x(t)} x(t)}}{\underbrace{\sum_{i=0}^{t-1} \alpha_{x(i)} + \alpha_{x(t)}}_{\alpha_{y(t-1)}}} \quad (4)$$

$$= \frac{\alpha_{y(t-1)} y(t-1) + \alpha_{x(t)} x(t)}{\alpha_{y(t-1)} + \alpha_{x(t)}}$$

$$\alpha_{y(t)} = \alpha_{Y(t-1)} + \alpha_{x(t)}$$

The weight used for obtaining the output data y(t) at time t is indicated by w(t) and is defined by the following equation.

$$W(t)=\alpha_{y(t-1)}/(\alpha_{y(t-1)}+\alpha_{x(t)}) \quad (5)$$

From equation (5), the following equation holds true.

$$1-w(t)=\alpha_{x(t)}/(\alpha_{y(t-1)}+\alpha_{x(t)}) \quad (6)$$

By using equations (5) and (6), the output data y(t) in equation (4) is expressed by the following weighted mean.

$$y(t)=w(t)y(t-1)+(1-w(t))x(t) \quad (7)$$

The weight w(t) (and 1−w(t)) used in equation (7) can be determined by the reliability $\alpha_{y(t-1)}$ of the previous output data y(t−1) at time t−1 and the reliability $\alpha_{x(t)}$ of the current input data x(t) according to equation (5). The reliability $\alpha_{y(t)}$ of the current output data y(t) in equation (4) can also be determined by the reliability $\alpha_{y(t-1)}$ of the previous output data y(t−1) at time t−1 and the reliability $\alpha_{x(t)}$ of the current input data x(t).

As the reliability $\alpha_{x(t)}$ of the input data x(t) or the reliability $\alpha_{y(t)}$ of the output data y(t), the reciprocal of the variance $\sigma_{x(t)}^2$ or $\sigma_{y(t)}^2$ is used. That is, the reliability $\alpha_{x(t)}$ and the reliability $\alpha_{y(t)}$ are expressed by the following equations.

$$\alpha_{x(t)}=1/\sigma_{x(t)}^2$$

$$\alpha_{y(t)}=1/\sigma_{y(t)}^2 \quad (8)$$

Then, the weight w(t) in equation (7) can be expressed by the following equation.

$$w(t)=\sigma_{x(t)}^2/(\sigma_{y(t-1)}^2+\sigma_{x(t)}^2) \quad (9)$$

In this case, 1−w(t) in equation (7) can be determined by the following equations.

$$1-W(t)=\sigma_{y(t-1)}^2/(\sigma_{y(t-1)}^2+\sigma_{x(t)}^2) \quad (10)$$

$\sigma_{y(t)}^2$ can be determined by the following equation.

$$\sigma_{y(t)}^2=w(t)^2\sigma_{y(t-1)}^2+(1-w(t))^2\sigma_{x(t)}^2 \quad (11)$$

In the NR processing circuit shown in FIG. 1, the weight w(t) (and 1−w(t)) is determined according to equation (5) (and equation (6)) by performing real-time learning, and by using the resulting weight w(t), the weighted mean between the previous output data y(t−1) and the current input data x(t) is calculated according to equation (7). Thus, the input data x(t) is adaptively processed, thereby effectively eliminating noise contained in'the input data x(t). As a result, the S/N ratio of the output data y(t) obtained from the NR processing circuit is improved over time.

More specifically, in FIG. 1, input data is supplied to a latch circuit $11_1$, for example, in time-series order. The latch circuit $11_1$, latches (stores) the input data in synchronization with, for example, the timing at which the input data is supplied, and supplies it to a subsequent latch circuit $11_2$ and an input-reliability calculator 12. Similarly, the latch circuit $11_2$ and a latch circuit $11_3$ latch input data output from the latch circuits $11_1$ and $11_2$, respectively, and supply it to the subsequent latch circuit $11_3$ and a latch circuit $11_4$, respectively, and to the input-reliability calculator 12. The latch circuit $11_4$ latches the input data output from the previous latch circuit $11_3$ and supplies it to the input-reliability calculator 12.

Not only the input data latched in the latch circuits $11_1$ through $11_4$, but also the same input data as the data supplied to the latch circuit $11_1$ are supplied to the input-reliability calculator 12. Accordingly, if the input data (given input data) x(t) is supplied to the latch circuit $11_1$ and the input-reliability calculator 12, the input data x(t−1) through x(t−4) latched in the latch circuits $11_1$ through $11_4$ are also supplied to the input-reliability calculator 12. The input-reliability calculator 12 calculates, for example, the variance of the input data x(t) through x(t−4), and supplies the reciprocal of the variance to an output-reliability calculator 13 and a weight calculator 15 as the reliability $\alpha_{x(t)}$ of the input data x(t) (hereinafter sometimes referred to as the "input reliability").

The output-reliability calculator 13 then calculates the reliability $\alpha_{y(t)}$ of the output data y(t) (hereinafter sometimes referred to as the "output reliability") by using the input reliability $\alpha_{x(t)}$ output from the input-reliability calculator 12 and an output from a latch circuit 14 according to equation (4). The output-reliability calculator 13 outputs the calculated output reliability to the latch circuit 14.

The latch circuit 14 then latches the output reliability $\alpha_{y(t)}$ in synchronization with, for example, the input data x(t), and supplies it to the output-reliability calculator 13 and the weight calculator 15. Accordingly, the previous output reliability $\alpha_{y(t-1)}$ is supplied to the output-reliability calculator 13 and the weight calculator 15 from the latch circuit 14.

The weight calculator 15 determines the weight w(t) by using the input reliability $\alpha_{x(t)}$ from the input-reliability calculator 12 and the output reliability $\alpha_{y(t-1)}$ from the latch circuit 14 according to equation (5), and outputs the determined weight w(t) to a weighting unit 21 and an operation unit 22.

The weighting unit 21 multiplies an output of a latch circuit 25 with the weight w(t) output from the weighting calculator 15, and supplies the resulting value to an operation unit 24. The operation unit 22 subtracts the weight w(t) output from the weighting calculator 15 from one and supplies the resulting value 1−w(t) to a weighting unit 23. Not only an output of the operation unit 22, but also the input data x(t), is supplied to the weighting unit 23. The weighting unit 23 then multiplies the output of the operation unit 22 with the input data x(t) and supplies the resulting value to the operation unit 24. The operation unit 24 adds the output of the weighting unit 21 and the output of the weighting unit 23, and outputs the resulting value as the output data y(t). The output data y(t) is also supplied to the latch circuit 25. The latch circuit 25 latches the output data from the operation unit 24 in synchronization with, for example, the input data x(t), and supplies it to the weighting unit 21.

That is, the weighting unit 21, the operation unit 22, the weighting unit 23, the operation unit 24 and the latch circuit 25 calculate the weighted mean according to equation (7) and outputs it as the output data y(t).

Figure 3:
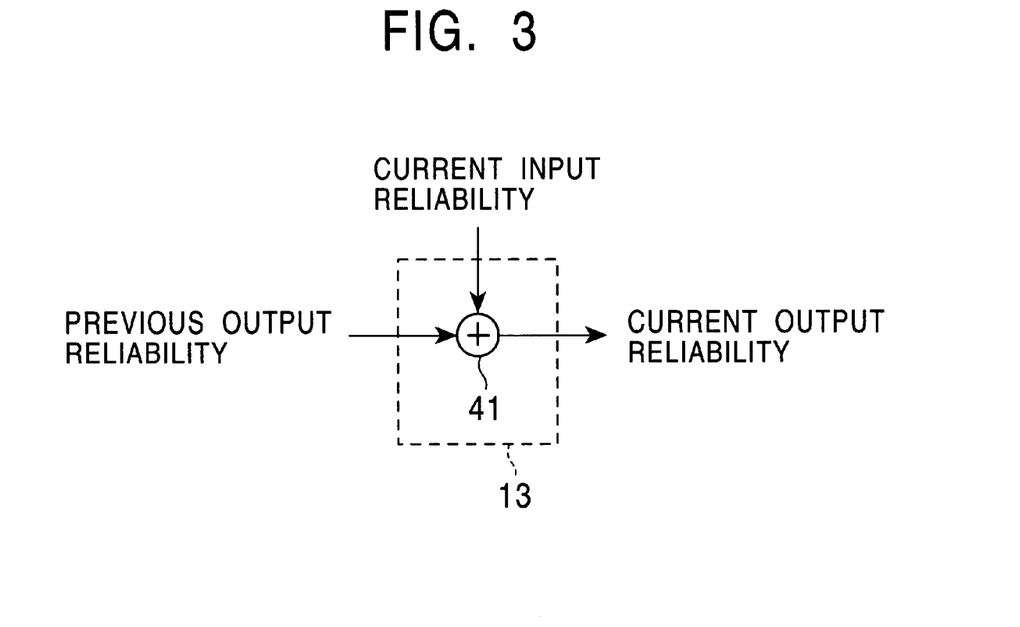
FIG. 3 is a block diagram illustrating the configuration of an output-reliability calculator 13 shown in FIG. 1.

FIG. 3 illustrates the configuration of the output-reliability calculator 13 shown in FIG. 1. The output-reliability calculator 13 is formed of an operation unit 41. Supplied to the operation unit 41 are the current input reliability $\alpha_{x(t)}$ from the input-reliability calculator 12 and the previous output reliability $\alpha_{y(t-1)}$ from the latch circuit 14. The operation unit 41 then adds the input reliability $\alpha_{x(t)}$ and the previous output reliability $\alpha_{y(t-1)}$ according to equation (4), and outputs the added value as the current output reliability $\alpha_{y(t)}$.

The operation of the NR processing circuit shown in FIG. 1 is as follows.

In the NR processing circuit, the variance $\sigma_{x(t)}^2$ is determined by using five samples, i.e., the current input data x(t) and the preceding input data x(t−1) through x(t−4), and the reciprocal of the variance $\sigma x(t)^2$ is further determined as the input reliability $\alpha_{x(t)}$.

The weight w(t) is then determined from the input reliability $\alpha_{x(t)}$ and the previous output reliability $\alpha_{y(t-1)}$. Based on the determined weight w(t), the weighted mean between the input data x(t) and the previous output data y(t−1) is calculated, which is then output as the output data y(t).

That is, the input data x(t) is supplied to the latch circuit $11_1$, the input-reliability calculator 12, and the weighting unit 23, and the input reliability $\alpha_{x(t)}$ is first determined in the input-reliability calculator 12.

More specifically, the latch circuit $11_1$ latches the supplied input data in synchronization with the timing at which the input data is supplied, and supplies the latched data to the subsequent latch circuit $11_2$ and to the input-reliability calculator 12. Likewise, the latch circuits $11_2$ and $11_3$ latch the input data output from the previous latch circuits $11_1$ and $11_2$ respectively,, and supply it to the subsequent latch circuits $11_3$ and $11_4$, respectively, and to the input-reliability calculator 12. The latch circuit $11_4$ latches the input data output from the previous latch circuit $11_3$ and supplies it to the input-reliability calculator 12. Accordingly, the input data x(t−1) through x(t−4) output from the latch circuits $11_1$ through $11_4$, respectively, as well as the input data x(t), are supplied to the input-reliability calculator 12. As stated above, the input-reliability calculator 12 determines the input reliability $\alpha_{x(t)}$ by using the input data x(t) through x(t−4), and supplies it to the output-reliability calculator 13 and the weight calculator 15.

Simultaneously with the supply of the input reliability $\alpha_{x(t)}$ from the input-reliability calculator 12 to the weight calculator 15, the output reliability $\alpha_{y(t-1)}$ output from the output-reliability calculator 13 at time t−1 is latched in the latch circuit 14. Thus, the weight calculator 15 calculates the weight w(t) by using the input reliability $\alpha_{x(t)}$ from the input-reliability calculator 12 and the output reliability $\alpha_{y(t-1)}$ latched in the latch circuit 14 according to equation (5). The weight w(t) is then supplied to the weighting unit 21 and the operation unit 22.

Subsequently, by using the weight w(t) output from the weight calculator 15, the weighting unit 21, the operation unit 22, the weighting unit 23, the operation unit 24 and the latch circuit 25 calculate the weighted mean between the input data x(t) and the previous output data y(t−1) according to equation (7).

More specifically, the weighting unit 21 multiples the output of the latch circuit 25 with the weight w(t) output from the weight calculator 15, and supplies the resulting value to the operation unit 24. In this case, at the timing at which the weight calculator 15 outputs the weight w(t), the latch circuit 25 latches the previous output data y(t−1) output from the operation unit 24 at time t−1. Accordingly, the weighting unit 21 calculates the product w(t)y(t−1) of the output data y(t−1) and the weight w(t), and supplies it to the operation unit 24.

Meanwhile, the operation unit 22 subtracts the weight w(t) output from the weight calculator 15 from one, and supplies the subtracted value 1−w(t) to the weighting unit 23. The weighting unit 23 then multiplies the output 1−w(t) from the operation unit 22 with the input data x(t), and supplies the resulting value (1−w(t))x(t) to the operation unit 24.

The operation unit 24 adds the output w(t)y(t−1) from the weighting unit 21 and the output (1−w(t))x(t) from the weighting unit 23, namely, the operation unit 24 calculates the weighted mean between the input data x(t) and the previous output data y(t−1) by using the weight w(t) output from the weight calculator 15 according to equation (7).

The calculated weighted mean is then output as the output data y(t). The output data y(t) is also supplied to and latched in the latch circuit 25.

The output reliability is updated in the output-reliability calculator 13. More specifically, the output-reliability calculator 13 adds the input reliability $\alpha_{x(t)}$ calculated by the input-reliability calculator 12 and the previous output reliability $\alpha_{y(t-1)}$ latched in the latch circuit 14 according to equation (4) so as to determine the current output reliability $\alpha_{y(t)}$, which is then output to the latch circuit 14. Thereafter, processing similar to the above-described processing is repeatedly performed on the subsequent input data.

As discussed above, the reliability (input reliability) $\alpha_{x(t)}$ of the current input data x(t) is first determined, and the previous output reliability $\alpha_{y(t-1)}$ is added thereto, thereby calculating the weight w(t). By using the weight w(t), the weighted mean between the current input data x(t) and the previous output data y(t−1) is calculated and is output as the output data y(t) in response to the input data x(t). Then, the reliability (output reliability) at of the output data y(t) is determined by adding the current input reliability $\alpha_{x(t)}$ and the previous output reliability $\alpha_{y(t-1)}$, thereby processing the subsequent input data x(t+1). Consequently, the application of the weight w(t) is learned so that only a small weight w(t) is applied to data components having a high level of noise, while a sufficiently large weight w(t) is applied to data components having a low level of noise, namely, the weight w(t) is adaptively determined in response to the input data. As a result, the output data continues to be improved with the progress of learning of the weight w(t), thereby obtaining output data with effectively reduced noise.

In the foregoing embodiment, the variance $\sigma_{x(t)}^2$ is calculated by using the five samples of input data x(t) through x(t−4). Accordingly, the reciprocal of the variance $\sigma_{x(t)}^2$, i.e., the input reliability $\alpha_{x(t)}$, cannot be determined until the time for processing the five samples elapses from the start of the receipt of the input data. Alternatively, neither the input reliability nor the output reliability may be calculated until the time for processing the five samples elapses, and the simple average of the data which have been input so far may be determined and output as the output data. The method for processing the data immediately after the receipt of the input data is not restricted to this modification.

In the aforementioned embodiment, the variance $\sigma_{x(t)}^2$ of the input data x(t) through x(t−4) is calculated, and the reciprocal of the variance $\sigma_{x(t)}^2$ is determined to be the input reliability $\alpha_{x(t)}$ of the input data x(t). However, to determine the input reliability $\alpha_{x(t)}$ representing the reliability of the input data with respect to the true value, a value reflecting an error of the input data x(t) with respect to the true value X, such as the one expressed by the following equation (12), may be ideally used. In equation (12), the reciprocal of the square of the error of the input data x(t) with respect to the true value X is set to be the input reliability $\alpha_{x(t)}$, which is equal to the reciprocal of the square of noise power contained in the input data x(t).

$$\alpha_{x(t)} = 1/(x(t)-X)^2 \qquad (12)$$

However, since the true value X of the input data x(t) is unknown, it is necessary to determine the input reliability $\alpha_{x(t)}$ without using the true value X. Accordingly, it is now assumed that a provisional true value X' is set, and the reciprocal of the square of the error of the input data x(t) with respect to the provisional true value X' is used as the input reliability $\alpha_{x(t)}$. Then, the input reliability $\alpha_{x(t)}$ is expressed by the following equation.

$$\alpha_{x(t)} = 1/\Delta_{x(t)}^2 = 1/(x(t)-X')^2 \qquad (13)$$

Figure 4:
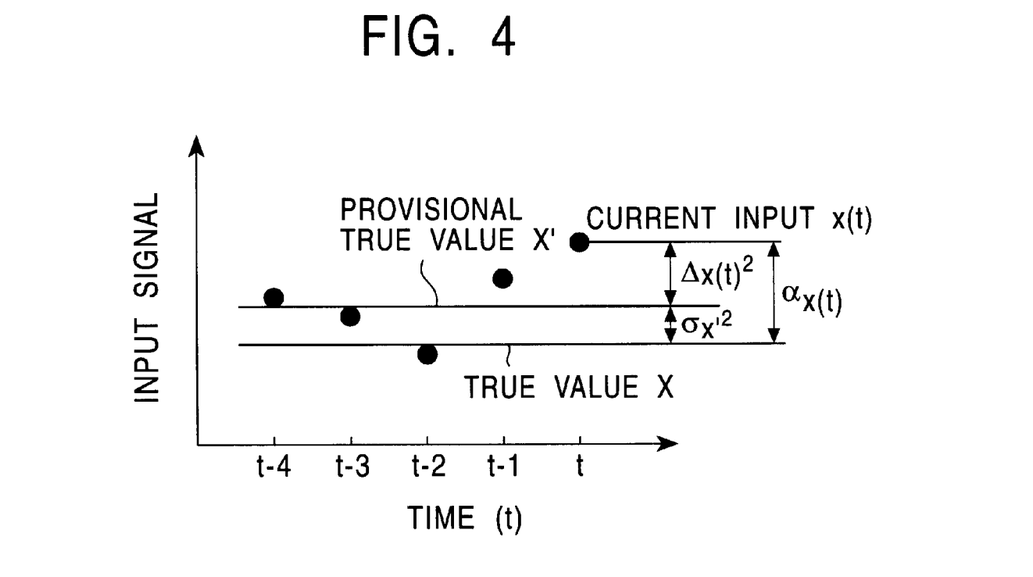
FIG. 4 illustrates the relationship between the provisional true value X' and the true value X.

Since $\Delta_{x(t)}^2$ in equation (13) is the square of the error $(x(t)-X')^2$ of the input data x(t) with respect to the provisional true value X', the level of noise contained in the input data x(t) can be approximately estimated. However, $\Delta_{x(t)}^2$ does not contain an error of the provisional true value X' with respect to the true value X, and thus, it is basically different from the square of the error $(x(t)-X)^2$ of the input data x(t) with respect to the true value X, as illustrated in FIG. 4.

Thus, the reliability of the square of the error $\Delta_{x(t)}^2$ with respect to the square of the error $(x(t)-X)^2$, i.e., the provisional-true-value reliability representing the reliability of the provisional true value X' with respect to the true value X is introduced as a correction term (correction value) $\sigma_{X'}^2$ for correcting the input reliability $\alpha_{x(t)}$. By using this correction term, the input reliability $\alpha_{x(t)}$ represented by the reciprocal of the square of the error $\Delta_{x(t)}^2$ of the input data x(t) with respect to the provisional input value X' is corrected, thereby obtaining a higher-precision input reliability $\alpha_{x(t)}$ (which indicates a more precise reliability of the input data x(t) with respect to the true value X).

More specifically, as the provisional true value X', the average value (moving average) of N number of input data x(t) through x(t−(N−1)) including the input data x(t), as expressed by the following equation (14), is used.

$$X' = \bar{x} = \frac{\sum_{n=0}^{N-1} x(t-n)}{N} \qquad (14)$$

In equation (14), x with a bar (‾) indicates the average of the input data x(t) through x(t−(N−1)), which is hereinafter referred to as "$\bar{x}$".

In this case, as the correction term $\sigma_{X'}^2$, the average $\overline{\sigma_{\bar{x}}^2}$ of the variance of N number of input data x(t) through x(t−(N−1)) including the input data x(t), as expressed by the following equation, can be used.

$$\sigma_{X'}^2 = \sigma_{\bar{x}}^2 = \frac{\sum_{n=0}^{N-1}(x(t-n)-\bar{x})^2}{N(N-1)} \qquad (15)$$

The value obtained by dividing the numerator of the right side in equation (15) by N−1 is equal to the variance of the input data x(t) through x(t−(N−1)), which is further divided by N in equation (15), thereby determining the average $\overline{\sigma_{\bar{x}}^2}$ of the variance of the input data x(t) through x(t−(N−1)). Statistically, $\overline{\sigma_{\bar{x}}^2}$ calculated by equation (15) is referred to as the "variance of the average". Practically, however, since the variance is divided by N, $\overline{\sigma_{\bar{x}}^2}$ is more easily understood as "average of the variance", which will thus be used hereinafter.

In this case, the input reliability $\alpha_{x(t)}$ can be corrected by the following equation.

$$\alpha_{x(t)} = 1/(\Delta_{x(t)}^2 + \sigma_{X'}^2) \qquad (16)$$

In equation (16), the square of the error $\Delta_{x(t)}^2$ (the reciprocal of the pre-corrected input reliability) of the input data x(t) with respect to the provisional true value X' is corrected by the correction term $\sigma_{X'}^2$, and the reciprocal of the corrected value is determined to be the corrected input reliability $\alpha_{x(t)}$. That is, the reciprocal of the value obtained by adding the correction term $\sigma_{X'}^2$ to the square of the error $\Delta_{x(t)}^2$ is determined to be the corrected input reliability $\alpha_{x(t)}$.

Statistically, the square of the error $\Delta_{x(t)}^2$ of the input data x(t) with respect to the provisional true value X' is estimated to be smaller than the square of the error $(x(t)-X)^2$ of the input data x(t) with respect to the true value X. Thus, as indicated by equation (16), the correction term $\sigma_{X'}^2$ is added to the square of the error $\Delta_{x(t)}^2$, and the reciprocal of the added value is set to be the input reliability $\alpha_{x(t)}$. Thus, the resulting input reliability $\alpha_{x(t)}$ indicates a more precise reliability of the input data x(t) with respect to the true value X.

Figure 5:
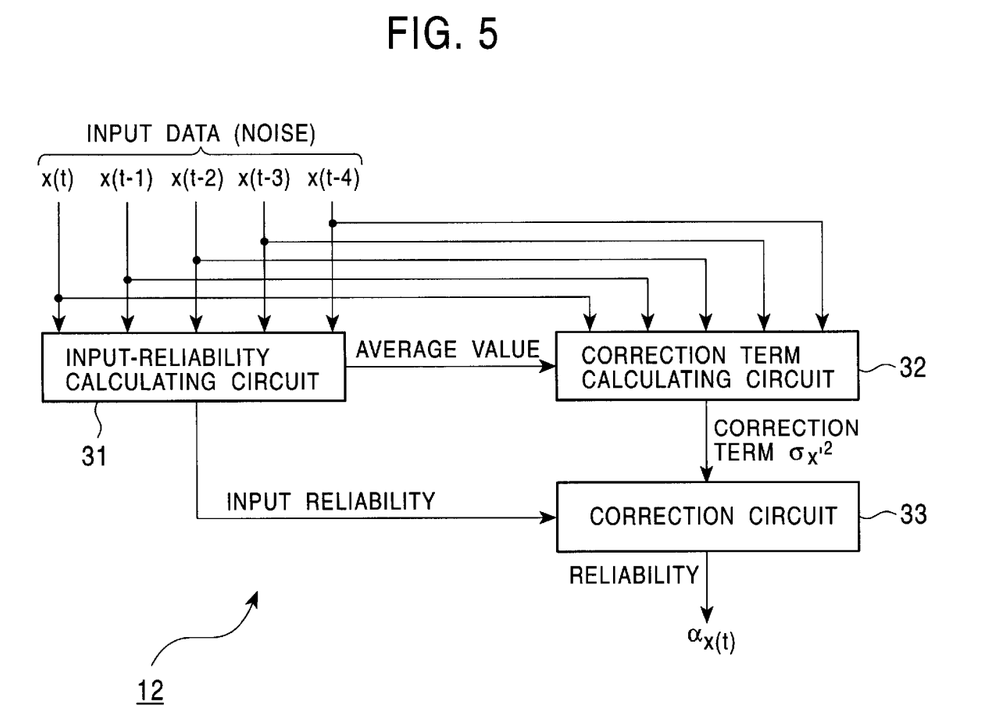
FIG. 5 is a block diagram illustrating the configuration of an input-reliability calculator 12 shown in FIG. 1.

FIG. 5 illustrates the configuration of the input-reliability calculator 12 when the corrected input reliability $\alpha_{x(t)}$ is determined in the above manner.

In this embodiment, as stated above, the previous five input data x(t) through x(t−4) including the input data x(t) are supplied to the input-reliability calculator 12. Accordingly, the number five is substituted for N in equations (14) and (15), thereby determining the input reliability $\alpha_{x(t)}$.

Referring to FIG. 5, the input data x(t) through x(t−4) are supplied to an input-reliability calculating circuit 31 and a correction-term calculating circuit 32. The input-reliability calculating circuit 31 calculates the average value $\bar{x}$ of the five samples of input data x(t) through x(t−4) according to equation (14). The input-reliability calculating circuit 31 determines the average value $\bar{x}$ to be the provisional true value X', and further calculates the input reliability $\alpha_{x(t)}$ according to equation (13). The input reliability $\alpha_{x(t)}$ is supplied to a correction circuit 33. The average value $\bar{x}$ of the input data x(t) through x(t−4) is also supplied to the correction-term calculating circuit 32 from the input-reliability calculating circuit 31.

The correction-term calculating circuit 32 calculates the average value $\overline{\sigma x^2}$ of the variance of the input data x(t) through x(t−(N−1)) by using the input data x(t) through x(t−4) and the average value $\bar{x}$ output from the input-reliability calculating circuit 31, and outputs the average value $\overline{\sigma x^2}$ to the correction circuit 33 as the correction term $\sigma_{x'}^2$.

The correction circuit 33 then corrects the input reliability $\alpha_{x(t)}$ output from the input-reliability calculating circuit 31 with the correction term $\sigma_{x'}^2$ output from the correction-term calculating circuit 32, and outputs the corrected value as the final input reliability, (corrected input reliability) $\alpha_{x(t)}$. That is, the correction circuit 33 adds the correction term $\sigma_{x'}^2$ to the square of the error $\Delta_{x(t)}^2$, i.e., to the reciprocal of the input reliability $\alpha_{x(t)}$, and outputs the reciprocal of the added value as the final input reliability $\alpha_{x(t)}$ according to equation (16).

Figure 6:
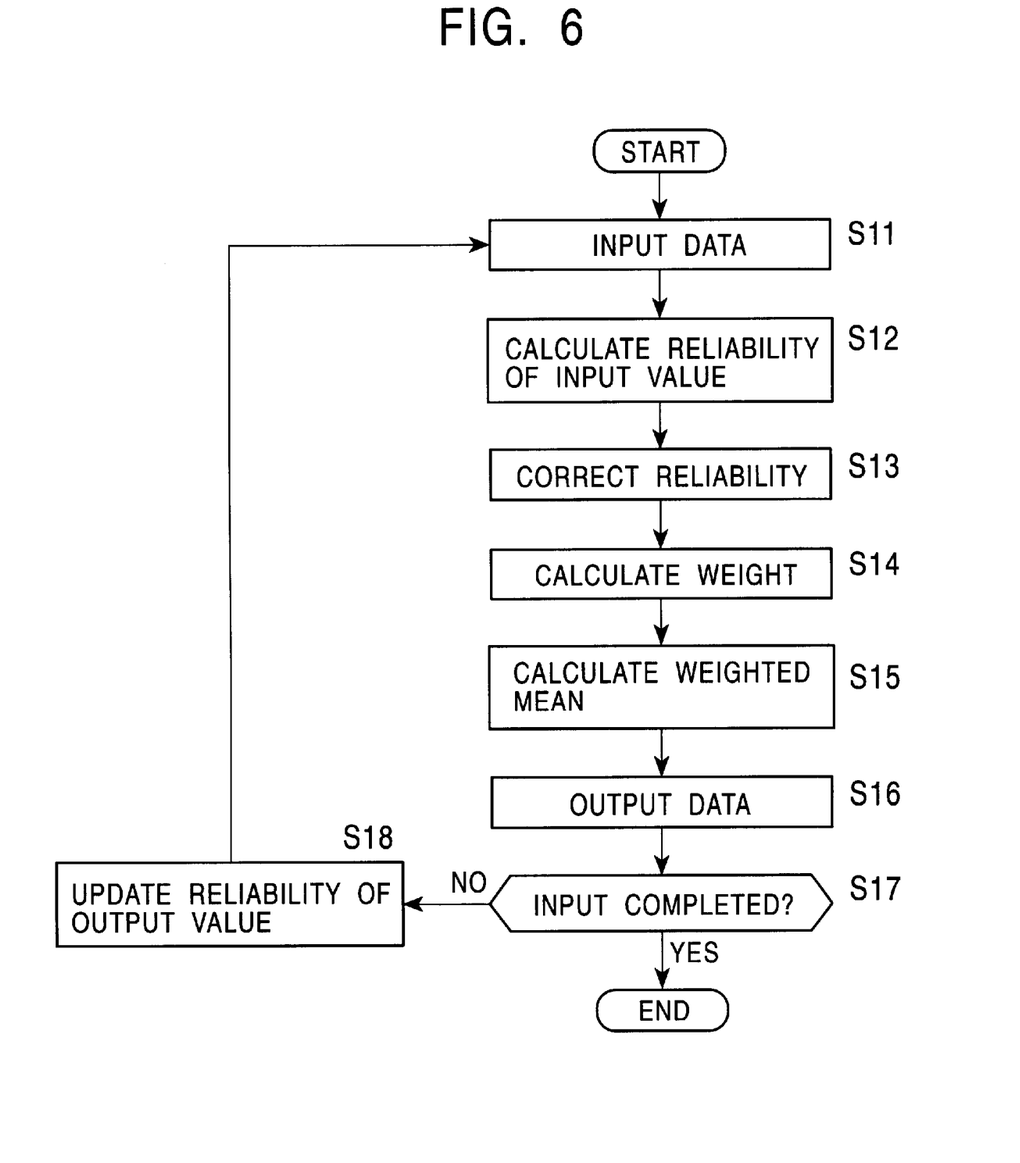
FIG. 6 is a flow chart illustrating the operation of the NR processing circuit shown in FIG. 1.

A description is now given, with reference to the flow chart of FIG. 6, of the operation of the NR processing circuit shown in FIG. 1 when the input-reliability calculator 12 is configured as shown in FIG. 5.

In step S11, the input data x(t) is supplied to the latch circuit $11_1$, the input-reliability calculator 12, and the weighting unit 23. Then, in step S12, the input reliability $\alpha_{x(t)}$ is calculated in the input-reliability calculator 12.

More specifically, as discussed above, simultaneously with the supply of the input data x(t), the input data x(t−1) through x(t−4) are supplied to the input-reliability calculator 12 from the latch circuits $11_1$ through $11_4$, respectively. In the input-reliability calculator 12, the average value $\bar{x}$ of the five samples of input data x(t) through x(t−4) is determined to be the provisional true value X' according to equation (14), and the input reliability $\alpha_{x(t)}$ is determined according to equation (13).

Thereafter, in step S13, the input-reliability calculator 12 determines the average value $\overline{\sigma x^2}$ of the variance to be the correction term $\sigma_{x'}^2$ from the input data x(t) through x(t−4) and the average value $\bar{x}$ according to equation (15). In step S13, the input reliability $\alpha_{x(t)}$ calculated according to equation (13) is corrected with the correction term $\sigma_{x'}^2$ according to equation (16), and the corrected input reliability $\alpha_{x(t)}$ is supplied to the output-reliability calculator 13 and the weight calculator 15.

As stated above, at the timing at which the input reliability $\alpha_{x(t)}$ is supplied to the weight calculator 15 from the input-reliability calculator 12, the previous output reliability $\alpha_{y(t−1)}$ output from the output-reliability calculator 13 at time t−1 is latched in the latch circuit 14. Thus, in step S14, the weight calculator 15 calculates the weight (t) from the input reliability $\alpha_{x(t)}$ output from the input-reliability calculator 12 and the output reliability $\alpha_{y(t−1)}$ latched in the latch circuit 14 according to equation (5). The weight w(t) is then supplied to the weighting unit 21 and the operation unit 22.

In step S15, as discussed above, by using the weight w(t) output from the weight calculator 15, the weighting unit 21, the operation unit 22, the weighting unit 23, the operation unit 24 and the latch circuit 25 calculate the weighted mean between the input data x(t) through the previous output data y(t−1) according to equation (7).

In step S16, the calculated weighted mean is output as the output data y(t) and is further supplied to and latched in the latch circuit 25.

It is then determined in step S17 whether all the input data have been processed. If the outcome of step S17 is no, the process proceeds to step S18 in which the output reliability is updated in the output-reliability calculator 13. More specifically, the output-reliability calculator 13 adds the corrected input reliability $\alpha_{x(t)}$ output from the input-reliability calculator 12 in step S13 to the previous output reliability $\alpha_{y(t−1)}$ latched in the latch circuit 14 according to equation (4) so as to determine the current output reliability $\alpha_{y(t)}$, which is then output to the latch circuit 14. The process then returns to step S11 in which the corresponding processing is performed on the subsequent input data.

If it is found in step S17 that there is no data to be processed, the processing is completed.

According to the aforementioned description, the reliability (input reliability) $\alpha_{x(t)}$ of the current input data x(t) is determined, and the correction term $\sigma_{x'}^2$ for correcting the input reliability $\alpha_{x(t)}$ is also determined. By using the correction term $\sigma_{x'}^2$, the input reliability $\alpha_{x(t)}$ is corrected. It is thus possible to obtain the input reliability $\alpha_{x(t)}$ indicating a more precise reliability of the input data x(t) with respect to the true value X, thereby achieving a more effective noise reduction.

The present invention may be used for eliminating noise from image data, sound data, and other types of data.

In the foregoing embodiment, the present invention is described with a view to achieving noise reduction. In essence, the weight w(t) is learned in real time so that the output data can be improved over time by adaptively processing the input data, and by using the resulting weight w(t), the processing is suitably performed, namely, the input data is self-adaptively processed. Accordingly, by using the present invention, waveform shaping of the input data may be performed.

In the aforementioned embodiment, the output data y(t) is determined by multiplying the output data y(t−1) with the weight w(t) and also multiplying the input data x(t) with the weight 1−w(t) in equation (7). However, only one of the output data y(t−1) and the input data x(t) may be multiplied with the weight w(t) so as to determine the output data y(t).

Although in the foregoing embodiment the corrected input reliability $\alpha_{x(t)}$ is determined according to equation (16), another technique may be employed for obtaining the input reliability $\alpha_{x(t)}$.

As the provisional true value X' of the input data x(t), the average value of the preceding input data including the current input data x(t) is used. Alternatively, the previous output data y(t−1) may be used as the provisional true value X', in which case, the input reliability $\alpha_{x(t)}$ may be corrected with the output reliability $\alpha_{y(t−1)}$ of the previous output data y(t−1), which serves as the correction term.

In the above-described embodiment, the reciprocal of the square of the error of the input data x(t) with respect to the provisional true value X' is set to be the input reliability $\alpha_{x(t)}$ to be corrected. However, another value may be used for the input reliability $\alpha_{x(t)}$ to be corrected.

As is seen from the foregoing description, according to the data processing method and apparatus of the present invention, the input reliability indicating the reliability of input data and the output reliability indicating the reliability of output data are calculated, thereby determining a predetermined correction value for correcting the input reliability. The input reliability is then corrected with the correction value, and the input data is processed based on the corrected input reliability and the output reliability, thereby obtaining the output data. It is thus possible to obtain an input reliability representing a more precise reliability of the input data with respect to the true value. By using this higher-precision input reliability, more effective noise reduction can be achieved.

What is claimed is:

1. A data processing apparatus for processing input data and for outputting the processed data as output data, comprising:
    input-reliability calculating means for calculating an input reliability indicating the reliability of the input data;
    output-reliability calculating means for calculating an output reliability indicating the reliability of the output data;
    correction-value calculating means for calculating a correction value for correcting the input reliability; and
    data processing means for processing the input data based on the input reliability corrected with the corrected value and-based on the output reliability, and for outputting the output data.

2. A data processing apparatus according to claim 1, further comprising weight-coefficient calculating means for calculating a weight coefficient based on the corrected input reliability and the output reliability, wherein said data processing means applies weights to given input data and previously obtained output data based on the weight coefficient calculated by said weight-coefficient calculating means, and adds the weighted given input data and the weighted previously obtained output data, thereby obtaining output data in response to the input data.

3. A data processing apparatus according to claim 1, wherein said input-reliability calculating means calculates an average value of the input data as a provisional true value of given input data, and determines the input reliability according to the provisional true value.

4. A data processing apparatus according to claim 3, wherein said correction-value calculating means calculates, as the correction value, provisional-true-value reliability representing the reliability of the provisional true value of the input data.

5. A data processing apparatus according to claim 1, wherein said correction-value calculating means calculates an average value of the variance of the input data as the correction value.

6. A data processing apparatus according to claim 5, wherein said input-reliability calculating means determines the average value of the input data to be the provisional true value of the given input data, and calculates the reciprocal of the square of an error of the input data with respect to the provisional true value as the input reliability, and wherein said data processing means adds the average value of the variance of the input data to the reciprocal of the input reliability, and determines the reciprocal of the added value to be the corrected input reliability.

7. A data processing method for processing input data and for outputting the processed data as output data, comprising:
    an input-reliability calculating step of calculating an input reliability indicating the reliability of the input data;
    an output-reliability calculating step of calculating an output reliability indicating the reliability of the output data;
    a correction-value calculating step of calculating a correction value for correcting the input reliability; and
    a data processing step of processing the input data based on the input reliability corrected with the corrected value and based on the output reliability, and of outputting the output data.

8. A data processing method according to claim 7, further comprising a weight-coefficient calculating step of calculating a weight coefficient based on the corrected input reliability and the output reliability, wherein in said data processing step, weights are applied to given input data and previously obtained output data based on the weight coefficient calculated in said weight-coefficient calculating step, and the weighted given input data and the weighted previously obtained output data are added, thereby obtaining output data in response to the input data.

9. A data processing method according to claim 7, wherein in said input-reliability calculating step, an average value of the input data is calculated as a provisional true value of given input data, and the input reliability is determined according to the provisional true value.

10. A data processing method according to claim 9, wherein in said correction-value calculating step, provisional-true-value reliability representing the reliability of the provisional true value of the input data is calculated as the correction value.

11. A data processing method according to claim 7, wherein in said correction-value calculating step, an average value of the variance of the input data is calculated as the correction value.

12. A data processing method according to claim 11, wherein, in said input-reliability calculating step, the average value of the input data is determined to be the provisional true value of the given input data, and the reciprocal of the square of an error of the input data with respect to the provisional true value is calculated as the input reliability, and wherein, in said data processing step, the average value of the variance of the input data is added to the reciprocal of the input reliability, and the reciprocal of the added value is determined to be the corrected input reliability.

* * * * *